(12) United States Patent
Osterweil et al.

(10) Patent No.: US 12,058,099 B1
(45) Date of Patent: *Aug. 6, 2024

(54) CLIENT CONTROLLED DOMAIN NAME SERVICE (DNS) RESOLUTION

(71) Applicant: VeriSign, Inc., Reston, VA (US)

(72) Inventors: Eric Osterweil, Fairfax, VA (US); Ashvatth Lakshmanan, Arlington, VA (US)

(73) Assignee: VeriSign, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/199,595

(22) Filed: May 19, 2023

Related U.S. Application Data (63) Continuation of application No. 17/220,666, filed on Apr. 1, 2021, now Pat. No. 11,700,230, which is a
(Continued)

(51) Int. Cl.
*H04L 61/4511* (2022.01)
*H04L 61/10* (2022.01)
*H04L 61/30* (2022.01)

(52) U.S. Cl.
CPC .......... *H04L 61/4511* (2022.05); *H04L 61/10* (2013.01); *H04L 61/30* (2013.01)

(58) Field of Classification Search
CPC ....... H04L 61/4511; H04L 61/10; H04L 61/30
See application file for complete search history.

(56) References Cited

U.S. PATENT DOCUMENTS

| 5,721,827 A | 2/1998 | Logan et al. |
| 6,119,143 A | 9/2000 | Dias et al. |

(Continued)

FOREIGN PATENT DOCUMENTS

| EP | 2579539 A1 | 4/2013 |
| EP | 3035650 A2 | 6/2016 |

(Continued)

OTHER PUBLICATIONS

Arends et al., Resource Records for the DNS Security Extensions. Network Working Group. 29 pages, Mar. 2005.
(Continued)

*Primary Examiner* — Thu V Nguyen
*Assistant Examiner* — Ranjan Pant
(74) *Attorney, Agent, or Firm* — McCarter & English, LLP; Michael A. Sartori (57) ABSTRACT

In one embodiment, a domain name system (DNS) server processes a DNS query based on a policy statement that is attached to the DNS query. Upon receiving the DNS query, the DNS server executes one or more commands specified in the policy statement to generate a query state. The query state controls DNS resolution behavior that the DNS server implements as part of processing the DNS query. The DNS server then performs one or more DNS resolution operations based on DNS query and the query state to generate a response. Advantageously, because the semantics of the policy statement are encapsulated within the policy statement, the policy statement enables a client to unambiguously control DNS resolution behavior. By contrast, conventional DNS resolution guidance mechanisms that rely on DNS servers to infer policies based on client data may not reflect the preferences of the clients.

20 Claims, 4 Drawing Sheets

Related U.S. Application Data continuation of application No. 15/253,663, filed on Aug. 31, 2016, now Pat. No. 10,999,240.

(56) References Cited

U.S. PATENT DOCUMENTS

| | | |
|---|---|---|
| 6,154,777 A | 11/2000 | Ebrahim |
| 6,338,082 B1 | 1/2002 | Schneider |
| 6,480,508 B1 | 11/2002 | Mwikalo et al. |
| 6,560,634 B1 | 5/2003 | Broadhurst |
| 6,678,717 B1 | 1/2004 | Schneider |
| 6,684,250 B2 | 1/2004 | Anderson et al. |
| 6,728,767 B1 | 4/2004 | Day et al. |
| 6,769,028 B1 | 7/2004 | Sass et al. |
| 6,839,421 B2 | 1/2005 | Ferraro Esparza et al. |
| 7,136,932 B1 | 11/2006 | Schneider |
| 7,152,118 B2 | 12/2006 | Anderson, IV et al. |
| 7,299,491 B2 | 11/2007 | Shelest et al. |
| 7,367,046 B1 | 4/2008 | Sukiman et al. |
| 7,386,849 B2 | 6/2008 | Dageville et al. |
| 7,533,266 B2 | 5/2009 | Bruekers et al. |
| 7,542,468 B1 | 6/2009 | Begley et al. |
| 7,565,402 B2 | 7/2009 | Schneider |
| 7,650,331 B1 | 1/2010 | Dean et al. |
| 7,720,057 B2 | 5/2010 | Igarashi |
| 7,725,536 B2 | 5/2010 | Douglis et al. |
| 7,796,978 B2 | 9/2010 | Jones et al. |
| 7,864,709 B2 | 1/2011 | Cheshire |
| 7,895,319 B2 | 2/2011 | Statia et al. |
| 7,917,616 B2 | 3/2011 | Trace et al. |
| 7,984,149 B1 | 7/2011 | Grayson |
| 7,991,910 B2 | 8/2011 | Richardson et al. |
| 8,037,168 B2 | 10/2011 | Schneider |
| 8,224,994 B1 | 7/2012 | Schneider |
| RE43,690 E | 9/2012 | Schneider et al. |
| RE44,207 E | 5/2013 | Schneider |
| 8,447,856 B2 | 5/2013 | Drako |
| 8,468,351 B2 | 6/2013 | Boesgaard Sorensen |
| 8,489,637 B2 | 7/2013 | Patil |
| 8,521,908 B2 | 8/2013 | Holmes et al. |
| 8,655,307 B1 | 2/2014 | Walker et al. |
| 8,990,356 B2 | 3/2015 | McPherson et al. |
| 9,015,323 B2 | 4/2015 | Kommula |
| 9,473,516 B1 | 10/2016 | Jezorek et al. |
| 10,169,571 B1 | 1/2019 | Attfield et al. |
| 10,263,958 B2 | 4/2019 | Bremen et al. |
| 10,270,755 B2 | 4/2019 | McPherson et al. |
| 10,530,734 B2 | 1/2020 | Kalinski et al. |
| 10,791,085 B2 | 9/2020 | Thakar |
| 10,819,697 B1 | 10/2020 | McPherson et al. |
| 10,999,240 B1 | 5/2021 | Osterweil et al. |
| 11,082,392 B1 | 8/2021 | Kaliski, Jr. et al. |
| 11,316,819 B1 | 4/2022 | Thakar |
| 11,700,230 B1 | 7/2023 | Osterweil et al. |
| 2001/0042109 A1 | 11/2001 | Bolas et al. |
| 2002/0073335 A1 | 6/2002 | Shuster |
| 2002/0099952 A1 | 7/2002 | Lambert et al. |
| 2002/0161745 A1 | 10/2002 | Call |
| 2003/0103645 A1 | 6/2003 | Levy et al. |
| 2003/0177240 A1 | 9/2003 | Gulko et al. |
| 2003/0182447 A1 | 9/2003 | Schilling |
| 2004/0039798 A1 | 2/2004 | Hotz et al. |
| 2004/0044791 A1 | 3/2004 | Pouzzner |
| 2004/0128514 A1 | 7/2004 | Rhoads |
| 2004/0194102 A1 | 9/2004 | Neerdaels |
| 2004/0210672 A1 | 10/2004 | Pulleyn et al. |
| 2005/0044352 A1 | 2/2005 | Pazi et al. |
| 2005/0259645 A1 | 11/2005 | Chen et al. |
| 2006/0056371 A1 | 3/2006 | Sakuda et al. |
| 2006/0088039 A1 | 4/2006 | Kakivaya et al. |
| 2006/0114133 A1 | 6/2006 | Fujita |
| 2006/0129665 A1 | 6/2006 | Toebes et al. |
| 2006/0192994 A1 | 8/2006 | Tanimoto |
| 2006/0242321 A1 | 10/2006 | Hegde et al. |
| 2007/0124487 A1 | 5/2007 | Yoshimoto et al. |
| 2007/0150611 A1* | 6/2007 | Chan .................. H04L 61/30 709/230 |
| 2007/0160200 A1 | 7/2007 | Ishikawa et al. |
| 2007/0204341 A1 | 8/2007 | Rand et al. |
| 2007/0250189 A1 | 10/2007 | Rourke et al. |
| 2007/0294419 A1 | 12/2007 | Ulevitch |
| 2008/0016233 A1 | 1/2008 | Schneider |
| 2008/0027809 A1 | 1/2008 | Storm |
| 2008/0052758 A1 | 2/2008 | Byrnes |
| 2008/0071616 A1 | 3/2008 | Hovnanian et al. |
| 2008/0178073 A1 | 7/2008 | Gao et al. |
| 2008/0189774 A1 | 8/2008 | Ansari et al. |
| 2009/0049164 A1 | 2/2009 | Mizuno |
| 2009/0055929 A1 | 2/2009 | Lee et al. |
| 2009/0113074 A1 | 4/2009 | Statia et al. |
| 2009/0157889 A1 | 6/2009 | Treuhaft |
| 2009/0158318 A1 | 6/2009 | Levy |
| 2009/0182884 A1 | 7/2009 | Datta et al. |
| 2009/0276803 A1 | 11/2009 | Weaver |
| 2010/0005146 A1 | 1/2010 | Drako et al. |
| 2010/0049872 A1 | 2/2010 | Roskind |
| 2010/0057936 A1 | 3/2010 | Roskind |
| 2010/0064047 A1 | 3/2010 | Sullivan |
| 2010/0070608 A1 | 3/2010 | Hosur |
| 2010/0077462 A1 | 3/2010 | Joffe et al. |
| 2010/0100957 A1 | 4/2010 | Graham et al. |
| 2010/0153558 A1* | 6/2010 | Kommula ............ H04L 61/4511 718/105 |
| 2010/0274970 A1 | 10/2010 | Treuhaft |
| 2011/0078292 A1 | 3/2011 | Ananda et al. |
| 2011/0099261 A1 | 4/2011 | Joshi |
| 2011/0153831 A1 | 6/2011 | Mutnuru et al. |
| 2011/0238192 A1 | 9/2011 | Shah et al. |
| 2012/0117621 A1* | 5/2012 | Kondamuru .......... H04L 63/168 726/3 |
| 2012/0147834 A1 | 6/2012 | Zisimopoulos et al. |
| 2012/0173684 A1 | 7/2012 | Courtney et al. |
| 2012/0185914 A1 | 7/2012 | Delco et al. |
| 2012/0191874 A1 | 7/2012 | Robinson et al. |
| 2012/0206653 A1 | 8/2012 | Graves et al. |
| 2013/0018944 A1 | 1/2013 | Shyamsunder et al. |
| 2013/0085914 A1 | 4/2013 | McPherson et al. |
| 2013/0191537 A1 | 7/2013 | Ivanov et al. |
| 2013/0198065 A1 | 8/2013 | McPherson et al. |
| 2013/0227141 A1* | 8/2013 | Schmidt ............ H04L 61/4511 709/225 |
| 2013/0254423 A1 | 9/2013 | George, IV |
| 2014/0036897 A1 | 2/2014 | Frydman et al. |
| 2014/0068043 A1 | 3/2014 | Archbold |
| 2014/0149601 A1 | 5/2014 | Carney et al. |
| 2014/0207835 A1 | 7/2014 | Jellick et al. |
| 2014/0215628 A1 | 7/2014 | Yan |
| 2014/0280305 A1 | 9/2014 | James et al. |
| 2014/0280963 A1 | 9/2014 | Burbridge et al. |
| 2014/0282847 A1 | 9/2014 | Blacka et al. |
| 2015/0074221 A1 | 3/2015 | Kuparinen et al. |
| 2015/0180892 A1 | 6/2015 | Balderas |
| 2015/0215267 A1 | 7/2015 | Kagan |
| 2015/0234816 A1* | 8/2015 | Chong ................ H04L 43/08 707/722 |
| 2015/0281111 A1 | 10/2015 | Carl |
| 2015/0295882 A1 | 10/2015 | Kaliski, Jr. |
| 2015/0304199 A1 | 10/2015 | Leask et al. |
| 2016/0036848 A1 | 2/2016 | Reddy et al. |
| 2016/0065675 A1* | 3/2016 | Brand ................ H04L 67/1097 709/213 |
| 2016/0072847 A1* | 3/2016 | Bremen ................ G06F 21/305 726/1 |
| 2016/0094645 A1 | 3/2016 | Ashutosh et al. |
| 2016/0127305 A1* | 5/2016 | Droms ................ H04L 61/4541 709/223 |
| 2016/0315969 A1 | 10/2016 | Goldstein |
| 2017/0005914 A1 | 1/2017 | Edge et al. |
| 2018/0041466 A9* | 2/2018 | Kagan ................ H04L 61/4511 |
| 2018/0063162 A1* | 3/2018 | Baughman .......... H04L 63/1416 |

(56) References Cited

U.S. PATENT DOCUMENTS

| | | |
|---|---|---|
| 2021/0021588 A1 | 1/2021 | McPherson et al. |
| 2022/0217112 A1 | 7/2022 | Thakar |

FOREIGN PATENT DOCUMENTS

| | | |
|---|---|---|
| JP | 2005-86700 A | 3/2005 |
| KR | 10-2007-0113600 A | 11/2007 |
| WO | WO-2000/14938 A2 | 3/2000 |
| WO | WO-2000/14939 A1 | 3/2000 |
| WO | WO-2006/114133 A1 | 11/2006 |
| WO | WO-2009/005433 A1 | 1/2009 |
| WO | WO-2017/083759 A1 | 5/2017 |

OTHER PUBLICATIONS

Basu et al., Persistent Delivery wtih Deferred Binding to Descriptively Named Destinations. MILCOM 2008, IEEE Military Communications Conference. 8 pages, (2008).

Bortzmeyer et al., DNS query name minimisation to improve privacy, draft-ietf-dnsop-qname-minimisation-00. Network Working Group. 7 pages, Oct. 22, 2014.

Busch, How to Set Up OpenDNS on Your Home Network [Router Configuration]. gPost. Retrieved online at: http://www.groovypost.com/howtosetup/-opendns-home-network-router/. 10 pages, Feb. 25, 2013.

But et al., Evaluating the impact of DNS and HTTP session characteristics on consumer ISP web traffic. TENCON 2005, 6 pages, Nov. 21-24, 2005.

Chandramouli et al., Challenges in Securing the Domain Name System. IEEE Security & Privacy. pp. 84-87, Jan./Feb. 2006.

Contavalli et al., Client IP information in DNS requests draft-vandergaast-edns-client-ip-01. dnsext. 23 pages, May 21, 2010.

Cox et al., The First 50 Years of Electronic Watermarking. EURASIP Journal on Applied Signal Processing. 2002;2:126-132.

Daley et al., Use of DNS SRV records for host selection draft-daley-dnext-host-srv-00.txt. Network Working Group. 13 pages, Dec. 31, 2009.

Damas et al., Extension Mechanisms for DNS (EDNS (0). Internet Engineering Task Force (IETF). 16 pages, Apr. 2013.

Datatracker, Managed Incident Lightweight Exchange (mile). Retrieved online at: https://datatracker.ietf.org/wg/mile/documents/. 2 pages, retrieved Nov. 24, 2020.

DNS-OARC, Domain Name System Operations Analysis and Research Center, Introduction to DNS-OARC. Retrieved online at: https://www.dns-oarc.net. 3 pages, Jul. 3, 2008.

Eastlake, Domain Name System Security Extensions. DNS Security Working Group. 57 pages, Dec. 1998.

Edmonds et al., Signaling DNS Capabilities. Networking Group. 7 pages, Jul. 2, 2017.

Elz et al., Clarifications to the DNS Specification. Network Working Group. 15 pages, Jul. 1997.

Getdns, Download the 1.6.0 beta release. Retrieve online at: https://tetdnsapi.net. 6 pages, retrieved Dec. 10, 2014.

Google, Set DNS. Retrieved online at: http://web.archive.org/web/20151003145236 htts://play.google.com/store/apps/details?id=uk.com/mytechie.setDNS&hl+en. 2 pages, Oct. 3, 2015.

Herzberg et al., Cipher-Suite Negotiation for DNSSEC Hop-by-Hop or End-to-End? IEEE Internet Computing. 2015 19(1):80-84.

Herzberg et al., Less is More: Cipher-Suite Negotiations for DNSSEC. Proceedings of the 30th Annual Computer Security Applications Conference, ACM. 10 pages, Dec. 8-12, 2014.

Herzberg et al., Negotiating DNSSEC Algorithms Over Legacy Proxies. International Conference on Cryptology and Network Security, CANS. pp. 111-126, (2014).

Hu et al., Starting TLS over DNS, draft-hzhwm-start-tls-for-dns-01. Network Working Group. 12 pages, Jul. 4, 2014.

Huque et al., Algorithm Negotiation in DNSSEC draft-huque-dnssec-alg-nego-01. Internet Engineering Task Force. 7 pages, Jul. 20, 2017.

Iana, Internet Assigned Nos. Authority, Domain Name System (DNS) Parameters. Retrieved online at: https://www.iana.org/assignments/dns-parameters/dns-parameters.xhtml. 4 pages, Aug. 30, 2017.

ICANN, Draft Contract for Services between ccTLD Managers and ICANN. ccTLD Constituency Draft Contract for Services. 8th Draft. Retrieved online at: https://archive.icann.org/en/cctlds/cctldconst-8th-draft-contract-14nov00.htm. 4 pages, Nov. 14, 2000.

ICANN, Identifier Technology Innovation Panel—Draft Report. The Internet Corporation for Assigned Names and Numbers. Retrieved online at: http://www.icann.org/en/about/planning/strategic-engagement/identifier-technology/report-21feb14-en.pdf. 28 pages, Feb. 21, 2014.

ICANN, RSSAC002, RSSAC Advisory on Measurements of the Root Server System. Retrieved online at: https://www.icann.org/en/system/files/files/rssac-002-measurements-root-20nov14-en.pdf. 15 pages, Nov. 20, 2014.

ICANN, Service Expectations of Root Servers. RSSAC-001, 10 pages, May 2, 2013.

IRTF, Information-Centric Networking Research Group, ICNRG. Retrieved online at: https://irtf.org/icnrg. 4 pages, Apr. 7, 2019.

Kaplan et al., DNS Extension for ENUM Source-URI draft-kaplan-enum-source-uri-00. ENUM Working Group. 10 pages, Dec. 11, 2007.

Kolkman et al., Architectural Considerations on Application Features in the DNS draft-iab-dns-applicatons-01. Network Working Group. 24 pages, Mar. 14, 2011.

Kumari et al., Decreasing Access Time to Root Servers by Running One on Loopback, draft-wkumari-dnsop-root-loopback-00. Network Working Group. 5 pages, Oct. 25, 2014.

Lashchiver, Domain Name System Anomaly Detection and Prevention. A Thesis Submitted in fulfillment of the requirements for the degree of Master of Science. School of Engineering and Computer Science, The Hebrew University of Jerusalem. 57 pages, Sep. 2010.

Lee et al., How to scale the DNS root system? draft-lee-dnsop-scalingroot-00.txt. DNSOP Working Group. 11 pages, Jul. 3, 2014.

Mantoro et al., An Implementation on Domain Name System Security Extensions Framework for the Support of IPv6 Environment. IEEE, 6 pages, (2022).

Mozilla Foundation, Public Suffix List. Retrieved online at: https://publicsuffix.org. 1 page, (2007).

Nagele, Analysis of Increased Query Load on Root Name Servers. Retrieved online at: https://labs.ripe.net/author/wnagele/increased-query-load-on-root-name-servers/. 6 pages, Jul. 11, 2011.

Osterweil et al., Opportunistic Encryption with DANE Semantics and IPsec: IPSECA draft-osterweil-dane-ipsec-03. DANE, 19 pages, Jul. 6, 2015.

Savolainen et al., Improved Recursive DNS Server Selection for Multi-Interfaced Nodes. Internet Engineering Task Force (IETF). 29 pages, Dec. 2012.

Sevilla et al., iDNS: Enabling Information Centric Networking Through The DNS. 2014 IEEE INFOCOM Workshops on Name-Oriented Mobility. pp. 476-481, (2014).

Shaikh et al., On the Effectiveness of DNS-based Server Selection. IEEE INFOCOM. Apr. 22, 2001;3:1801-1810.

Shimokawa et al., Flexible Server Selection in Widely Distributed Environments. Research Reports on Information Services and Electrical Engineering of Kyushu University. Mar. 5, 2000(1):7-12.

Taxii, Trusted Automated exchange of Indicator Information (TAXII™) 1.x Archive Website. Go to the TAXII 2.0 website (https://oasis-open.github.io/documentation/). Retrieved online at: taxiiproject.github.lo. 2 pages, (2019).

Tyson, How Encryption Works. Retrieved online at: Howstuffworks.com. 13 pages, Dec. 6, 2005.

Ulevitch, Introducing FamilyShield Parental Controls. Retrieved online at: https://umbrella.cisco.com/blog/introducing-familyshield-parental-controls. 3 pages, Jun. 23, 2010.

VeriSign, Comments on Identifier Technology Innovation Panel Draft Report. Press release, http://mm.icann.org/pipermail/itipanel/attachments/20140430/361e539a/verisign-comments-panel-2014-04-30-0001.pdf. 4 pages, Apr. 30, 2014.

Verisign, New gTLD Security and Stability Considerations. Versign Labs Technical Report #1130007 version 2.2. 10 pages, Mar. 2013.

(56) References Cited

OTHER PUBLICATIONS

Versign, New gTLD Security, Stability, Resiliency Update: Exploratory Consumer Impact Analysis. Versign Labs Technical Report #1130008 Version 1.1. 28 pages, Aug. 22, 2013.

Vixie, Passive DNS and ISC SIE. DNS-OARC Workshop, retrieved online at: https://indico.dns-oarc.net/contributionDisplay.py?contribid=4&confid=8. 10 pages, Nov. 2-3, 2007.

Weimer, Passive DNS Replication. FIRST, retrieved online at: http://www.enyo.de/fw/sofrware/dnslogger/first2005-paper.pdf. 13 pages, Apr. 2005.

Chinese Office Action for Application No. 201410148379.0, dated Feb. 23, 2018, 27 pages.

European Office Action for Application No. 12187127.1, dated Jan. 25, 2013, 6 pages.

European Office Action for Application No. 12187127.1, dated Sep. 15, 2017, 5 pages.

European Office Action for Application No. 14159613.0, dated Jun. 26, 2014, 8 pages.

European Office Action for Application No. 15200405.7, dated May 30, 2016, 10 pages.

European Office Action for Application No. 15163265.0, dated Aug. 27, 2015, 4 pages.

European Office Action for Application No. 19173127.2, dated Oct. 7, 2019, 15 pages.

International Preliminary Report on Patentability for Application No. PCT/US2016/061679, dated May 15, 2018, 8 pages.

International Search Report and Written Opinion for Application No. PCT/US2016/061679, dated Feb. 28, 2017, 13 pages.

U.S. Non-Final Office Action for U.S. Appl. No. 14/252,483, dated Oct. 30, 2015, 31 pages.

U.S. Non-Final Office Action for U.S. Appl. No. 14/252,483, dated Aug. 12, 2016, 19 pages.

U.S. Final Office Action for U.S. Appl. No. 14/252,483, dated Feb. 26, 2016, 17 pages.

U.S. Non-Final Office Action for U.S. Appl. No. 14/252,483, dated May 26, 2017, 24 pages.

U.S. Non-Final Office Action for U.S. Appl. No. 13/836,682, dated Sep. 3, 2013, 23 pages.

U.S. Non-Final Office Action for U.S. Appl. No. 13/836,682, dated Aug. 26, 2014, 28 pages.

U.S. Appl. No. 17/028,616, filed Sep. 22, 2020, U.S. Pat. No. 11,316,819, Issued.

U.S. Appl. No. 17/220,666, filed Apr. 1, 2021, U.S. Pat. No. 11,700,230, Issued.

U.S. Appl. No. 15/348,905, filed Nov. 10, 2016, U.S. Pat. No. 10,791,085, Issued.

U.S. Appl. No. 15/253,663, filed Aug. 31, 2016, U.S. Pat. No. 10,999,240, Issued.

U.S. Appl. No. 17/062,147, filed Oct. 2, 2020, 2021-0021588, Published.

U.S. Appl. No. 17/702,952, filed Mar. 24, 2022, 2022-0217112, Published.

\* cited by examiner

CLIENT CONTROLLED DOMAIN NAME SERVICE (DNS) RESOLUTION

CROSS-REFERENCE TO RELATED APPLICATIONS

This application is a continuation of U.S. patent application Ser. No. 17/220,666, filed on Apr. 1, 2021, which is a continuation of U.S. patent application Ser. No. 15/253,663, filed on Aug. 31, 2016, now U.S. Pat. No. 10,999,240 issued May 4, 2021, the subject matter of each of which are hereby incorporated herein by reference.

BACKGROUND OF THE INVENTION

Field of the Invention

Embodiments of the present invention relate generally to computer networks and, more specifically, to client controlled domain name service (DNS) resolution.

Description of the Related Art

As is well known, the domain name service (DNS) is the part of the Internet infrastructure that translates human-readable domain names into the Internet Protocol (IP) numbers needed to establish TCP/IP (Transmission Control Protocol/Internet Protocol) communication over the Internet. The DNS is the mechanism that allows users to refer to web sites and other Internet resources via intuitive domain names, such as "example.com," rather than the actual numeric IP addresses, e.g., 192.0.2.78, that are associated with different websites and other Internet resources. As referred to herein, an "Internet resource" may be any type of device or service that is accessible via the Internet.

Each domain name is typically made up of a series of character strings or "labels," where every two such character strings within the domain name are separated by a dot. The right-to-left order of the labels within a domain name corresponds to a top-to-bottom order of domain names in a DNS hierarchy. In a process referred to as "DNS resolution," DNS servers traverse the DNS hierarchy to translate the domain names specified in various DNS queries into corresponding IP addresses associated with different Internet resources. As persons skilled in the art will recognize, a given domain name can correspond to multiple different IP addresses. For example, www.example.com may correspond to both an Internet resource with the IP address 192.0.2.78 that is located in the United States and another Internet resource with the IP address 192.168.1.100 that is located in France. Further, each portion of the DNS hierarchy may be redundantly maintained by multiple different DNS servers.

During the DNS resolution process, some DNS servers attempt to infer "policies" from client data and then customize the DNS resolution process based on the inferred policies. For example, Extension Mechanisms for DNS (EDNS) specifies an EDNS-client-subnet that can be attached to a DNS query to specify the IP address of the client. A DNS server that supports the EDNS-client-subnet could use the specified IP address to first determine the location of the client and then select the corresponding Internet resource that is geographically closest to the client.

One problem associated with customizing the DNS resolution process based on client data is that the client does not have control over how DNS servers interpret the client data. For example, suppose that a DNS server optimizes the DNS resolution process to select the Internet resource that is geographically closest to a client based on the IP address. Such a DNS server may not customize the DNS resolution process to reflect the preferences of a client with a heightened security posture that would rather the DNS server select an Internet resource that is located is the same country as the client instead of an Internet resource that is geographically closer to the client. As a general matter, conventional mechanisms for customizing the DNS resolution process do not provide the control and/or the level of customization that many clients desire.

As the foregoing illustrates, what is needed in the art are more expressive techniques for domain name service resolution.

SUMMARY OF THE INVENTION

One embodiment of the present invention sets forth a method for processing a domain name service (DNS) query. The method includes determining that the DNS query is associated with a policy statement that includes one or more commands, executing the one or more commands to generate a query state, and generating a response to the DNS query based on the query state.

Further embodiments provide, among other things, a computer-readable medium configured to implement the method set forth above and a computer-readable medium configured to control a domain name service (DNS) resolution process.

One advantage of the disclosed techniques is that the policy statement enables clients to control the DNS resolution process. Because a DNS server that implements the disclosed techniques executes a policy statement that is attached to a DNS query, clients may unambiguously configure how the DNS server responds to the DNS query. By contrast, conventional DNS resolution guidance mechanisms rely on DNS servers for the correct interpretation of client data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
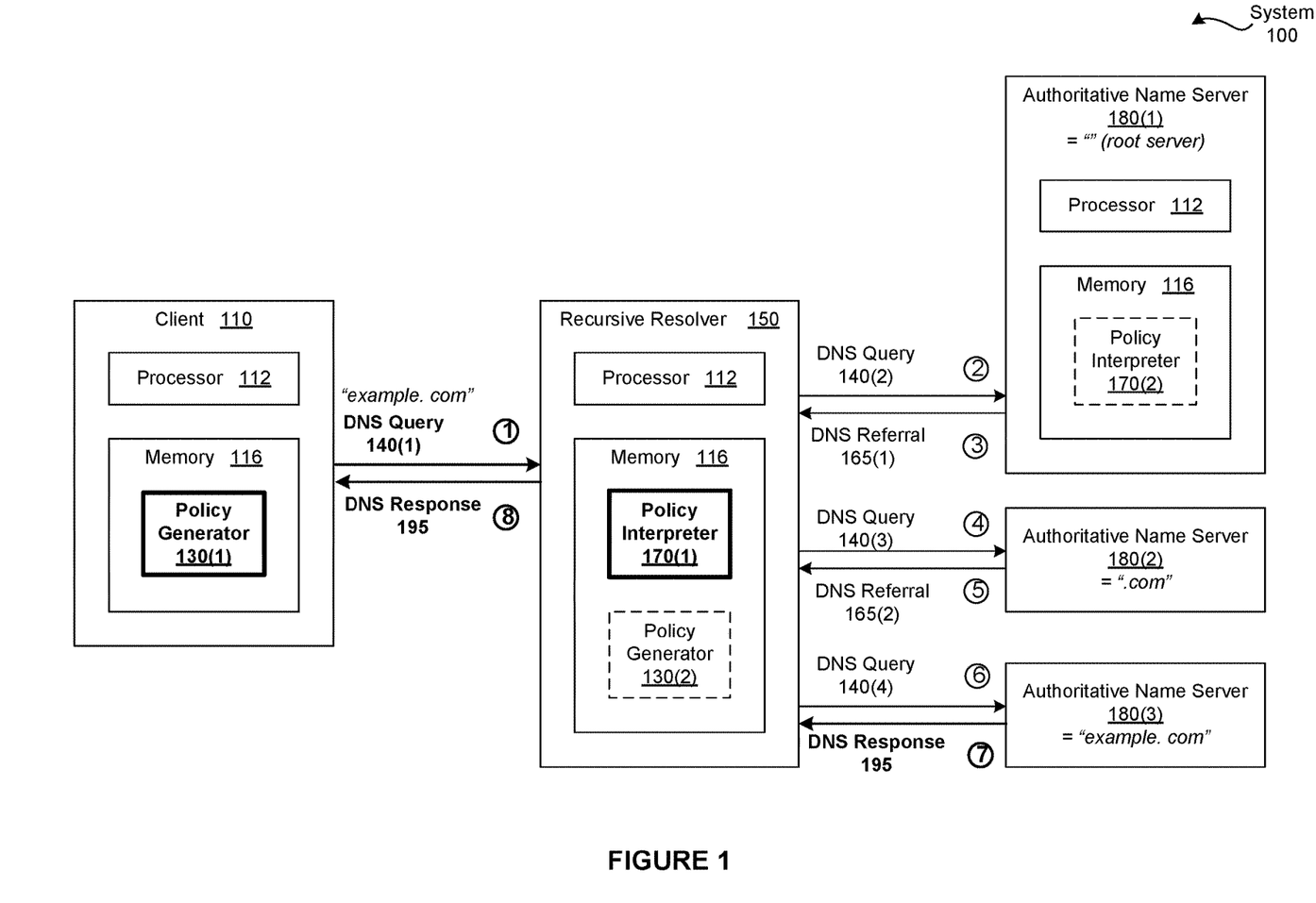
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, a client 110, a recursive resolver 150, and one or more authoritative name servers 180. In alternate embodiments, the system 100 may include any number of clients 110, any number of recursive resolvers 150, and any number of authoritative name servers 180 in any combination. For explanatory purposes, multiple instances of like objects are denoted with reference numbers identifying the object and parenthetical numbers identifying the instance where needed.

As shown, the client 110, the recursive resolver 150, and the authoritative name servers 180 include, without limitation, a processor 112 and a memory 116. The processor 112 may be any instruction execution system, apparatus, or device capable of executing instructions. For example, the processor 112 could comprise a central processing unit (CPU), a digital signal processor (DSP), a controller, a microcontroller, a state machine, or any combination thereof.

The memory 116 stores content, such as software applications and data, for use by the associated processor 112. The memory 116 may be any type of non-volatile memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In alternate embodiments, each of the client 110, the recursive resolver 150, and the authoritative name servers 180 may include any number (including zero) and types of processors 112 and any number (including zero) and types of memories 116 in any combination. The processor 112 and the memory 116 may be implemented in any technically feasible fashion. For example, and without limitation, in various embodiments, the processor 112 and/or the memory 116 may be implemented as a stand-alone chip or as part of a more comprehensive solution that is implemented as an application-specific integrated circuit (ASIC) or a system-on-a-chip (SoC). In some embodiments, the client 110, the recursive resolver 150, and/or the authoritative name servers 180 may interact with one or more clouds (e.g., encapsulated shared resources, software, data, etc.) to perform operations associated with the system 100. In such embodiments, the processor 112 and/or the memory 116 may be implemented in the cloud instead of in the client 110, the recursive resolver 150, and/or the authoritative name servers 180.

As a general matter, the system 100 includes, without limitation, entities and software that provide underlying technologies to support essential Internet functions, such as communications and security. In particular, the recursive resolver 150 and the authoritative name servers 180 provide a portion of a framework that implements the domain name system (DNS) protocol. For explanatory purposes, entities that provide the framework that implements the DNS protocol, including the recursive resolver 150 and the authoritative name servers 180, are referred to herein as "DNS servers." In alternate embodiments, the system 100 may include any number and types of other DNS servers in addition to the recursive resolvers 150 and the authoritative name servers 180. For example, in various embodiments, the system 100 may include forwarding resolvers.

The DNS is the part of the Internet infrastructure that translates human-readable domain names into the Internet Protocol (IP) numbers needed to establish TCP/IP (Transmission Control Protocol/Internet Protocol) communication over the Internet. The DNS is the mechanism that allows users to refer to web sites and other Internet resources via intuitive domain names, such as "example.com," rather than the actual numeric IP addresses, e.g., 192.0.2.78, that are associated with different websites and other Internet resources. Each domain name is typically made up of a series of character strings or "labels," where every two such character strings within the domain name are separated by a dot. The right-to-left order of the labels within a domain name correspond to the top-to-bottom order of domain names in a DNS hierarchy. The right-most label in a domain name is known as the top-level domain ("TLD"). Examples of well-known TLDs are "com"; "net"; "org"; and the like. Each TLD supports second-level domains, listed immediately to the left of the TLD, e.g., the "example" level in "example.com". Domains can nest within the hierarchy for many levels.

In general, the DNS enables users to associate a variety of information with domain names based on resource records. For example, in addition to storing address records that map domain names to IP addresses, the DNS stores service records (SRV) that identify services. Further, the DNS stores text records (TXT) that include arbitrary text and enable the DNS to serve as a general purpose database. A hierarchy of the DNS servers included in the system 100 maintain the resource records in large databases. In a process referred to herein as "DNS resolution," DNS servers traverse the DNS hierarchy to translate the domain names specified in various DNS queries 140 into corresponding IP addresses associated with different Internet resources. As referred to herein, an "Internet resource" may be any type of device or service that is accessible via the Internet.

For explanatory purposes only, FIG. 1 depicts a sequence of events involved in a DNS resolution process using a series of numbered bubbles. First, as depicted with the bubble numbered 1, the client 110 generates and transmits the DNS query 140(1) to the recursive resolver 150. The DNS query 140(1) requests information associated with the domain name "example.com." The client 110 is any entity capable of transmitting a DNS query 140 that requests information based on a domain name to a DNS server. For example, in various embodiments, the client 110 may be a stub resolver, a web browser, or an operating system, to name a few.

The client 110 may transmit the DNS query 140 in response to any type of event. For example, suppose that a user visits a website "example.com" via a web browser executing on a computer. Further, suppose that a cache associated with the client 110 (e.g., stub resolver) executing on the computer does not include a suitable translation for "example.com" to a corresponding IP address. In such a scenario, the client 110 could generate and transmit the DNS query 140(1) requesting the IP address associated with "example.com" to the recursive resolver 150. The recursive resolver 150 is a DNS server that may be configured to traverse the DNS hierarchy to obtain a DNS response 195 to the DNS query 140(1).

Upon receiving the DNS query 140(1), the recursive resolver 150 typically attempts to respond to the DNS query 140(1) based on information stored in a cache associated with the recursive resolver 150. If the cache associated with the recursive resolver 150 does not include the information requested in the DNS query 140(1), then the recursive resolver 150 traverses the DNS hierarchy in an attempt to obtain the requested information. The recursive resolver 150 may traverse the DNS hierarchy in any technically feasible fashion that is consistent with the DNS protocol. For example, the recursive resolver 150 may begin traversing the DNS hierarchy at the root level.

In general, each of the authoritative name servers 180 maintains an associated portion of the DNS hierarchy and is configured to answer the DNS queries 140 based on information contained in the associated portion of the DNS hierarchy. The authoritative name server 180 may answer the DNS query 140 in any manner that is consistent with the DNS protocol. For example, in some embodiments, the authoritative name server 180 may answer the DNS query 140 with a positive DNS response 195, a negative DNS response 195, or a DNS referral 165. The positive DNS response 195 provides the requested information based on the portion of the DNS hierarchy associated with the authoritative name server 180. The negative DNS response 195 indicates that the authoritative name server 180 is unable to provide the requested information. The referral DNS response 165 specifies another authoritative name server 180 that may be able to provide the requested information.

As depicted with the bubble numbered 2, after receiving the DNS query 140(1) from the client 110, the recursive resolver 150 generates and transmits the DNS query 140(2) to the authoritative name server 180(1) "root server." In response to the DNS query 140(2) and as depicted with the bubble numbered 3, the authoritative name server 180(1) "root server" transmits the DNS referral 165(1) to the recursive resolver 150. The DNS referral 165(1) specifies the authoritative name server 180(2) that is responsible for the ".com." portion of the DNS hierarchy.

As depicted with the bubble numbered 4, the recursive resolver 150 then generates and transmits the DNS query 140(3) to the authoritative name server 180(2) ".com." In response to the DNS query 140(3) and as depicted with the bubble numbered 5, the authoritative name server 180(2) ".com" transmits the DNS referral 165(2) to the recursive resolver 150. The DNS referral 165(2) specifies the authoritative name server 180(3) that is responsible for the "example.com." portion of the DNS hierarchy.

As depicted with the bubble numbered 6, the recursive resolver 150 then generates and transmits the DNS query 140(4) to the authoritative name server 180(3) "example.com." The authoritative name server 180(3) "example.com" is able to provide the requested information based on the associated portion of the DNS hierarchy. Consequently, as depicted with the bubble numbered 7, the authoritative name server 180(3) "example.com" transmits the DNS response 195 to the recursive resolver 150. As depicted with the bubble numbered 8, upon receiving the DNS response 195, the recursive resolver 150 forwards the DNS response 195 to the client 110.

As persons skilled in the art will recognize, a given domain name can correspond to multiple different IP addresses. For example, example.com may correspond to both an Internet resource with the IP address 192.0.2.78 that is located in the United States and another Internet resource with the IP address 192.168.1.100 that is located in France. Further, each portion of the DNS hierarchy may be redundantly maintained by multiple different authoritative name servers 180. As referred to herein, the resolution of the DNS query 140 includes the IP addresses of the DNS servers that process the DNS query 140 and the IP addresses of any Internet resource(s) identified in the DNS response 195. In a complementary manner, the DNS servers that process the DNS query 140 and any Internet resource(s) identified in the DNS response 195 are referred to herein as the entities involved in the resolution of the DNS query 140.

Notably, the client 110 and/or instigator that initiates the DNS query 140 oftentimes has preferences and/or restrictions regarding the DNS resolution process. For example, a user that enters a uniform resource locator (URL) into a browser may prefer that the resolution of the DNS query 140 involve only entities that are located in countries that are favorable to human rights. In another example, a company may require that the resolution of the DNS query 140 involve only entities that are located in the United States. For explanatory purposes, the preferences and/or requirements of any entity involved in issuing the DNS query 140 are referred to herein as the preferences of the client 110.

As a general matter, conventional mechanisms for guiding the DNS resolution process do not provide the control and/or the level of customization that many clients desire. For example, Extension Mechanisms for DNS (EDNS) specifies an EDNS-client-subnet that can be attached to the DNS query 140 to specify the IP address of the client 110. DNS servers that support the EDNS-client-subnet can implement a "policy" based on the IP address specified by the EDNS-client subnet to guide the DNS resolution process. For example, the authoritative name server 180 could use the specified IP address to determine the location of the client 110 and then select the Internet resource that is geographically closest to the client 110.

While such conventional DNS resolution guidance mechanisms provide client data to guide DNS resolution, the policies implemented by the DNS servers determine how those DNS servers process and interpret that client data. Because each DNS server may process and interpret client data differently, the DNS resolution process may not reflect the actual preferences of the client 110. Further, many existing DNS resolution mechanisms, as configured, cannot implement certain client preferences.

Examples of preferences that are difficult, if not impossible, to implement based on conventional DNS resolution guidance mechanisms include, without limitation:

Resolution based on historic traffic volumes;
Resolution based on time zones;
Specifying privacy restrictions;
Limiting resolution to entities that are located in selected countries and/or regions;
Prohibiting resolution to entities that are located in countries included in a specific; governmental list;
Resolution based on data from a defense graph;
Prohibiting resolution to locations that are associated with censorship issues;
Limiting resolution to entities that comply with specific censorship requirements;
Resolution based on the source jurisdiction of corporations or entities;
Resolution based on historical weather trends and/or forecasts; and Restricting resolution to entities that are favorable to human rights.

Client Controlled DNS Resolution

To enable the client 110 to direct the DNS resolution process in an expressive fashion, the client 110 includes, without limitation, a policy generator 130(1) and the recursive resolver 150 includes, without limitation, a policy interpreter 170(1). The policy generator 130(1) comprises a software program that generally resides with the memory 116 and is executed by the processor 112 associated with the client 110. Similarly, the policy interpreter 170(1) comprises a software program that generally resides within the memory 116 and is executed by the processor 112 associated with the recursive resolver 150.

In operation, the policy generator 130(1) produces a policy statement (not shown in FIG. 1) that the client 110 attaches to the DNS query 140(1). The policy statement includes one or more commands that specify DNS resolution behavior. The policy statement may be expressed in any technically feasible fashion. For example, in some embodiments, the policy statement may be written in an existing scripting language (e.g., Lua) or a markup language (e.g., Extensible Markup Language). In other embodiments, the policy statement may be written in a customized programming language. In various embodiment, the policy statement may specify one or more instances of primitive elements that encapsulate predefined DNS resolution behavior. The specified DNS resolution behavior may include, without limitation, resolution preferences, resolution requirements, and data sharing policies, to name a few.

When the recursive resolver 150 receives the DNS query 140(1), the policy interpreter 170(1) executes the policy statement to generate a query state. The policy interpreter 170(1) may execute the policy statement in any technically feasible fashion. For example, if the policy statement is written in the Lua scripting language, then the policy generator 170 executes the policy statement using a Lua interpreter. The query state may include any number and type of data that affects the behavior of the recursive resolver 150. The recursive resolver 150 then performs DNS resolution operation based on the query state to generate the DNS response 195 to the DNS query 140. For example, if the policy statement restricts resolution to entities in the Pacific Time Zone, then the recursive resolver 150 could generate and transmit DNS queries 140 to only the subset of authoritative name servers 180 that are located in the Pacific Time Zone.

As a general matter, the policy statement may specify any type of behavior in any technically feasible fashion. For example, the policy statement may include any combination of preferences and requirements. Notably, if the recursive resolver 150 is unable translate a particular domain name into an IP addresses based on required behavior specified in the policy statement, then the recursive resolver 150 returns a negative DNS response 195 to the client 110.

In various embodiments, the recursive resolver 150 may include the policy generator 130(2). The policy generator 130(2) included in the recursive resolver 150 may or may not include the same functionality as the policy generator 130(1) included in the client 110. If the recursive resolver 150 includes the policy generator 130(2), then as part of generating a new DNS query 140, the recursive resolver 150 may generate and attach a new policy statement. The policy generator 130 (2) may produce the new policy statement in any technically feasible fashion. For example, in some embodiments, the policy generator 130(2) may replicate the policy statement included in the DNS request 140(1) received from the client 110 to produce the new policy statement. In other embodiments, the policy generator 130 (2) may add or delete commands specified in the policy statement included in the DNS request 140(1) received from the client 110 to produce the new policy statement. In yet other embodiments, the policy generator 130(2) may not use the policy statement included in the DNS request 140(1) to produce the new policy statement.

In a complementary fashion, in various embodiments, one or more of the authoritative name servers 180 may include the policy interpreter 170(2). The policy interpreter 170(2) included in a particular authoritative name server 180 may or may not include the same functionality as the policy interpreter 170(1) included in the recursive resolver 150 or policy interpreters 170 included in other authoritative name servers 180. However, irrespective of the specific implementation, the policy interpreter 170(2) is configured to execute the policy statement attached to a received DNS query 140 to generate a query state that controls the behavior of the authoritative name server 180.

In various embodiments, any number and combination of the clients 110 and the recursive resolvers 150 may or may not include the policy generator 130. Similarly, any number and combination of the recursive resolvers 150 and the authoritative name servers 180 may or may not include the policy interpreter 170. In various embodiments, if a particular recursive resolver 150 or authoritative name server 180 does not implement the policy interpreter 170, then the behavior of the recursive resolver 150 or authoritative name server 180 is not impacted by the policy statement. Further, if a policy statement is not attached to a particular DNS query 140, then the behavior of the recursive resolver 150 or authoritative name server 180 that receives the DNS query 140 is not impacted by the policy interpreter 170. In various embodiments, the functionality implemented in the policy generator 130 and/or policy interpreter 170 may be disabled, enabled, or modified in any technically feasible fashion. Further, the policy generator 130 and/or the policy interpreter 170 may collaborate with any other mechanism for directing DNS resolution behavior in any technically feasible fashion.

The descriptions of the various embodiments have been presented for purposes of illustration, but are not intended to be exhaustive or limited to the embodiments disclosed. Further, the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques. As a general matter, the techniques outlined herein are applicable to facilitating "downstream" control of "upstream" DNS resolution behavior via a policy statement that specifies one or more operations. As referred to herein, a DNS server that receives a DNS query 140 from a requester is upstream of the requester, and the requester is downstream of the DNS server. Accordingly, the client 110 is downstream of the recursive resolver 150, and the client 110 and the recursive resolver 150 are downstream of the authoritative name servers 180.

In alternate embodiments, the client 110 may transmit DNS queries 140 directly to the authoritative name servers 180. In such embodiments, to obtain a particular resource record, the client 110 may traverse the DNS hierarchy in any technically feasible fashion and issue any number of DNS queries 140. Further, the client 110 may attach policy statements to any number of the DNS queries 140. When one of the authoritative name servers 180 receives the DNS query 140 from the client 110, if the authoritative name server 180 includes the policy interpreter 170, then the policy interpreter 170 executes the policy statement.

In other alternate embodiments, the system 100 includes a content delivery network (CDN) that stores multiple copies of digital content for vendors in clusters of severs that are located in different geographic regions. When the client 110 submits a request to access content stored within the CDN, a control server selects a server cluster and directs the request to the selected server cluster for processing. In such embodiments, the control server included in the CDN may implement the policy interpreter 170 and/or the policy generator 130 to enable the client 110 to control the resolution of the request based on any number and type of criteria.

Figure 2:
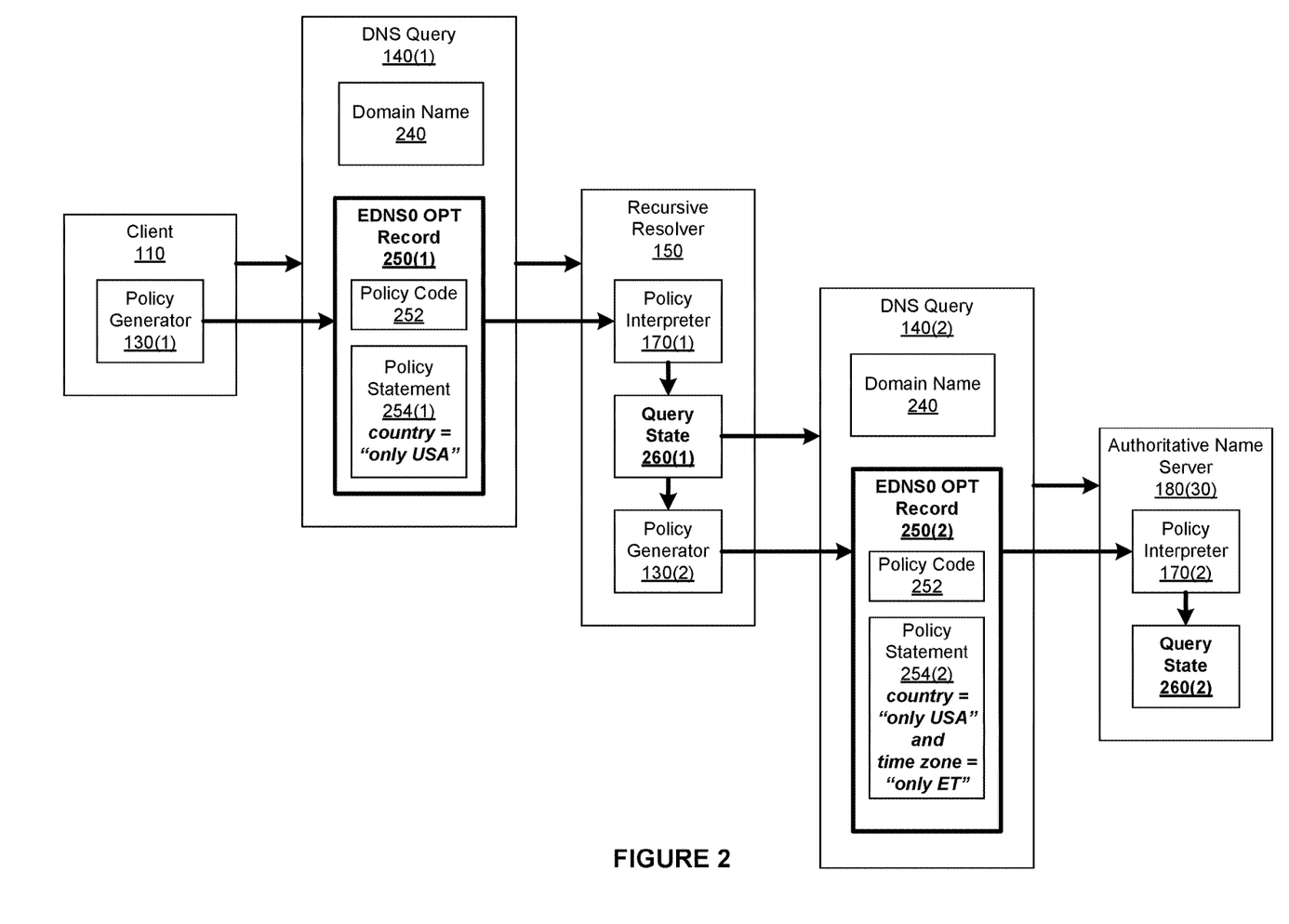
FIG. 2 illustrates how the client of FIG. 1 controls a domain name system (DNS) resolution process through a policy statement, according to various embodiments of the present invention.

FIG. 2 illustrates how the client 110 of FIG. 1 controls a domain name system (DNS) resolution process through a policy statement 254, according to various embodiments of the present invention. For explanatory purposes only, the depicted DNS resolution process includes only a single authoritative name server 180(30). Further, the client 110 includes the policy generator 130(1), the recursive resolver 150 includes the policy interpreter 170(1) and the policy generator 130(2), and the authoritative name server 180(30) includes the policy interpreter 170(2).

To instigate the DNS resolution process, the client 110 generates the DNS query 140(1). As shown, the DNS query 140(1) includes, without limitation, a domain name 240 and an Extension Mechanisms for DNS Version 0 (EDNS0) OPT record 250(1). The domain name 240 is an input to the DNS resolution process. During the DNS resolution process, the DNS servers attempt to translate the domain name 240 into a corresponding IP address. The EDNS0 OPT record 250(1) is a pseudo resource record that the client 110 attaches to the DNS query 140(1) in compliance with DNS Extension protocols. Notably, the EDNS0 OPT record 250(1) provides information to DNS servers but is not included in the DNS hierarchy that is maintained by the DNS servers.

As shown for the EDNS0 OPT record 250(1), each of the EDNS0 OPT records 250 includes, without limitation, a policy code 252 and the policy statement 254. The policy code 252 is a predetermined value that indicates that the EDNS0 OPT record 250 programmatically specifies policy-based DNS resolution behavior via the policy statement 254. In alternate embodiments, the client 110 may attach the policy statement 254 to the DNS query 140 and identify the purpose of the policy statement 254 to the DNS servers in any technically feasible fashion that is consistent with the DNS protocol.

In operation, the policy generator 130(1) included in the client 110 generates the EDNS0 OPT record 250(1) that includes the policy statement 254(1). The policy generator 130(1) may generate the EDNS0 OPT record 250(1) and the policy statement 254(1) in any technically feasible fashion. Further, the policy statement 254(1) may specify the desired DNS resolution behavior in any technically feasible fashion. For example, in some embodiments, the policy generator 130(1) may translate user-configurable options into a Lau script to generate the policy statement 254(1). The user-configurable options may include any number of resolution preferences, resolution restrictions, security precautions, data sharing restrictions, and so forth. In other embodiments, the policy generator 130(1) may generate the EDNS0 OPT record 250(1) based on a predetermined policy statement 254 that specifies DNS resolution behavior in any technically feasible fashion and using any predetermined syntax. In yet other embodiments, the policy generator 130(1) may identify a predetermined EDNS0 OPT record 250(1).

After the policy generator 130(1) generates the EDNS0 OPT record 250(1), the client 110 attaches the EDNS0 OPT record 250(1) to the DNS query 140(1) and transmits the DNS query 140(1) to the recursive resolver 150. Upon receiving the DNS query 140(1), the recursive resolver 150 determines that the EDNS0 OPT record 250(1) is attached to the DNS query 140(1). The recursive resolver 150 performs one or more comparison operations on the policy code 252 to determine that the EDNS0 OPT record 250(1) includes the policy statement 254(1) that defines DNS resolution behavior. After the recursive resolver 150 determines that the DNS query 140(1) is associated with the policy statement 254(1), the policy interpreter 170(1) included in the recursive resolver 150 executes the policy statement 254(1). In alternate embodiments, the recursive resolver 150 may determine that the policy statement 254(1) is associated with the DNS query 140(1) and may execute the policy statement 254(1) in any technically feasible fashion.

As shown, when the policy interpreter 170(1) executes the policy statement 254(1), the policy interpreter 170(1) generates a query state 260(1). The query state 260(1) includes any number and type of information that control the DNS resolution operations performed by the recursive resolver 150. In particular, the query state 260(1) may impact the number, resolution, and/or content of the new DNS queries 140 that the recursive resolver 150 generates as part of resolving the DNS query 140(1). Further, the policy generator 130(2) may generate new EDNS0 records 250 and new policy statements 254 based on, at least in part, the query state 260(1).

For example, as shown, the policy statement 254(1) specifies that the DNS resolution process is limited to DNS servers and Internet resources that are located in the USA. Consequently, the policy statement 254(1) configures the recursive resolver 150 to disregard any authoritative name servers 180 that are not located in the USA. In this fashion, the set of authoritative name servers 180 to which the recursive resolver 150 transmits DNS queries 140 is controlled via the policy statement 254(1). As also shown, the policy generator 130(2) generates the new policy statement 254(2) based on the query state 260(1).

More specifically, in the example depicted, the policy generator 130(2) adds the additional restriction that the DNS resolution process is limited to DNS servers and Internet resources that are located in the Eastern Time Zone. As a result, the policy statement 254(2) restricts the DNS resolution process to DNS servers and Internet resources that are located in the USA and in the Eastern Time Zone. In alternate embodiments, the policy generator 130(2) may generate the policy statement 254(2) in any technically feasible fashion that may or may not be based on the query state 260(1) and/or the policy statement 254(1). Subsequently, the policy generator 130(2) generates the EDNS0 OPT record 250(2) that specifies the policy code 252 and includes the policy statement 254(2).

The recursive resolver 150 then generates the DNS query 140(2) that specifies the domain name 240 and attaches the DNS0 OPT record 250(2) to the DNS query 140(2). Subsequently, the recursive resolver 150 selects the authoritative name server 180(30) based on the domain name 240 included in the DNS query 140(2), the query state 260(1), and/or any resolution algorithms implemented within the recursive resolver 150. Finally, the recursive resolver 150 transmits the DNS query 140(2) to the authoritative name server 180(30).

Upon receiving the DNS query 140(2), the authoritative name server 180(30) determines that the EDNS0 OPT record 250(2) is attached to the DNS query 140(2). The authoritative name server 180(30) performs one or more comparison operations on the policy code 252 to determine that the EDNS0 OPT record 250(1) includes the policy statement 254(2) that defines DNS resolution behavior. After the authoritative name server 180(30) determines that the DNS query 140(2) is associated with the policy statement 254(2), the policy interpreter 170(2) included in the authoritative name server 180(30) executes the policy statement 254(2). In alternate embodiments, the authoritative name server 180(30) may determine that the policy statement 254(2) is associated with the DNS query 140(2) and may execute the policy statement 254(2) in any technically feasible fashion.

As shown, when the policy interpreter 170(2) executes the policy statement 254(2), the policy interpreter 170(2) generates the query state 260(2). The query state 260(2) includes any number and type of information that control the DNS resolution operations performed by the authoritative name server 180(30). In particular, the query state 260(2) may impact the type and content of the response generated by the authoritative name server 180(30). For example, in the example depicted, the policy statement 254(2) configures the query state 260(2) to restrict the DNS resolution process to DNS servers and Internet resources that are located in the United States and the Eastern Time Zone. As a result, if the authoritative name server 180(30) determines that the only Internet resources that correspond to the domain name 240 lie in Ontario, then the authoritative name server 180(30) transmits a negative DNS response 195 to the recursive resolver 150. By contrast, suppose that the authoritative name server 180(30) determines that a particular Internet resource that corresponds to the domain name 240 lies in New York. In such a scenario, the authoritative name server 180(30) may translate the domain name 240 into the IP address of the Internet resource and transmit a positive DNS response 195 that includes the requested information to the recursive resolver 150.

Figure 3:
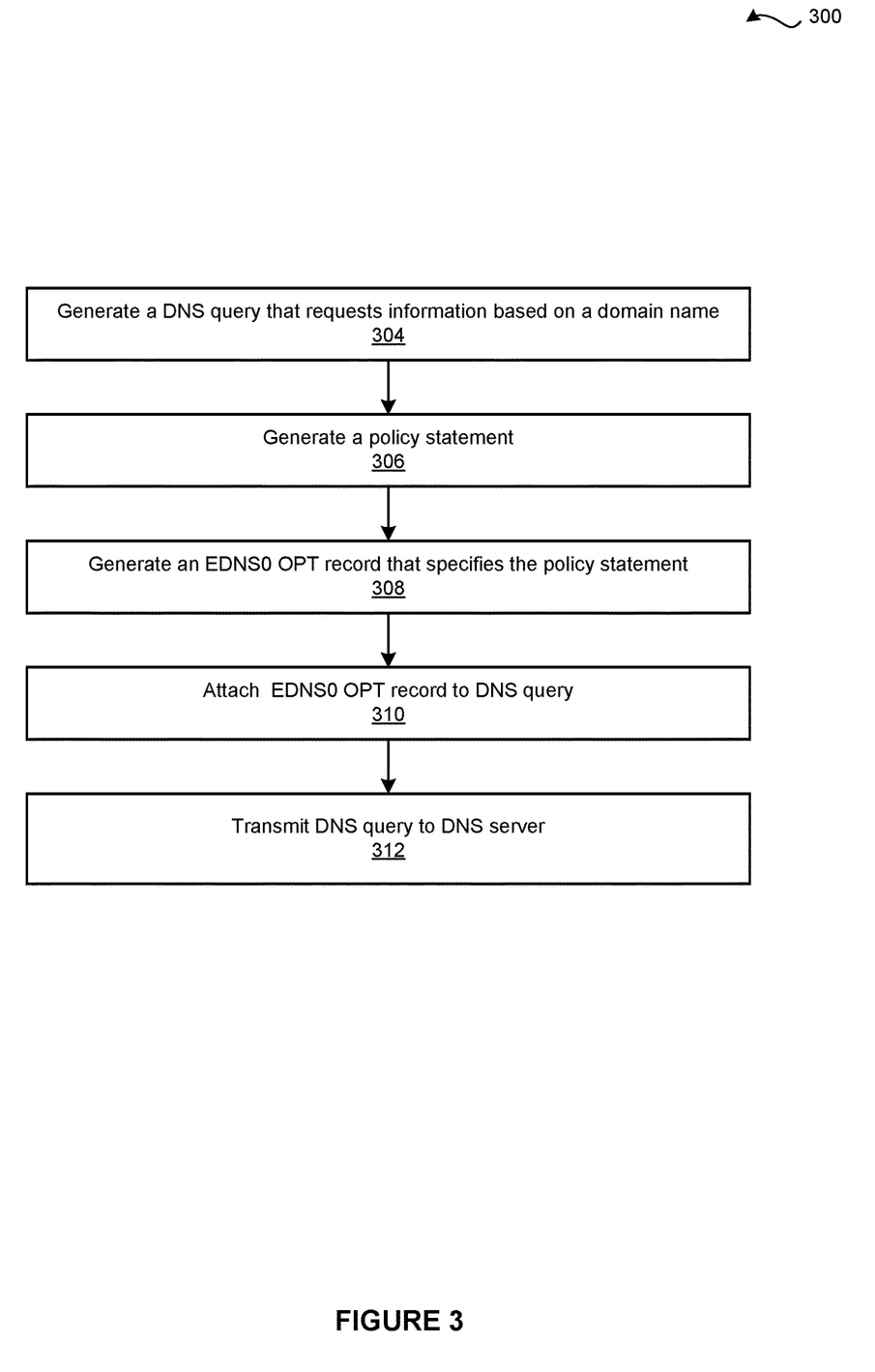
FIG. 3 is a flow diagram of method steps for controlling a domain name service (DNS) resolution process, according to various embodiments of the present invention.

FIG. 3 is a flow diagram of method steps for controlling a domain name service (DNS) resolution process, according to various embodiments of the present invention. Although the method steps are described with reference to the systems of FIGS. 1-2, persons skilled in the art will understand that any system configured to implement the method steps, in any order, falls within the scope of the present invention. In various embodiments, the method steps of FIG. 3 may be implemented by any "requester" that is capable of generating and transmitting the DNS request 140 to an "upstream" DNS server. As referred to herein, a DNS server that receives a request from a requester is upstream of the requester, and the requester is downstream of the DNS server.

For example, in some embodiments, the client 110 may implement the method steps of FIG. 3 and the upstream DNS server may be the recursive resolver 150. In other embodiments, the client 110 may implement the method steps of FIG. 3, and the upstream DNS server may be the authoritative name server 180. In yet other embodiments, the recursive resolver 150 may implement the method steps of FIG. 3, and the upstream DNS server may be the authoritative name server 180.

As shown, a method 300 begins at step 304, where a requester generates a DNS query 140 that requests information based on a domain name. The requester may generate the DNS query 140 in any technically feasible fashion that complies with the DNS protocol. At step 306, the policy generator 130 included in the requester generates the policy statement 254. The policy generator 130 may generate the policy statement 254 in any technically feasible fashion based on any type and amount of information. For example, in some embodiments, the policy generator 130 identifies a predetermined script written in the Lua scripting language as the policy statement 254. The policy statement 254 may specify any number of operations that programmatically specify preferences and/or limitations that may affect DNS resolution behavior. Examples of such preferences and limitations include resolution restrictions, resolution preferences, data sharing restrictions, and so forth.

In various embodiments, the policy generator 130 may generate different policy statements 254 based on different domain names or any other information in any technically feasible fashion. Further, the policy generator 130 may generate policy statements 254 that codify different policy semantics based on any number and type of information, such as query semantics. As persons skilled in the art will recognize, query semantics may include query names, query types, and so forth.

At step 308, the policy generator 130 generates the EDNS0 OPT record 250 that specifies the policy statement 254. The policy generator 130 may generate the EDNS0 OPT record in any technically feasible fashion. For example, in some embodiments the policy generator 130 includes the EDNS0 OPT record and a predetermined policy code 252 in the EDNS0 OPT record. The policy code 252 indicates that the EDNS0 OPT record is associated with the policy statement 254. At step 310, the policy generator 130 attaches the EDNS0 OPT record 250 to the DNS query 140. In alternate embodiments, the policy generator 130 may associate the policy statement 254 with the DNS query 140 in any technically feasible fashion that may or may not be based on the EDNS0 OPT record 250.

At step 312, the requester transmits the DNS query 140 to a DNS server. The requester may select and transmit the DNS query 140 in any technically feasible fashion that is consistent with the DNS protocol. For example, in some embodiments, the requester is stub resolver that is configured to transmit the DNS query 140 to a predetermined recursive resolver 150. In various embodiments, the requester may generate any number of additional DNS queries 140 based on any number of the method steps of FIG. 3 to obtain the requested information. For example, suppose that the requester is the recursive resolver 150 and the requester receives the DNS referral 265 in response to the DNS query 140. In such a scenario, the recursive resolver 150 could repeat any number of steps 304-312 in any combination to generate and transmit a new DNS query 140 to a different upstream resolver specified in the DNS referral 265.

Figure 4:
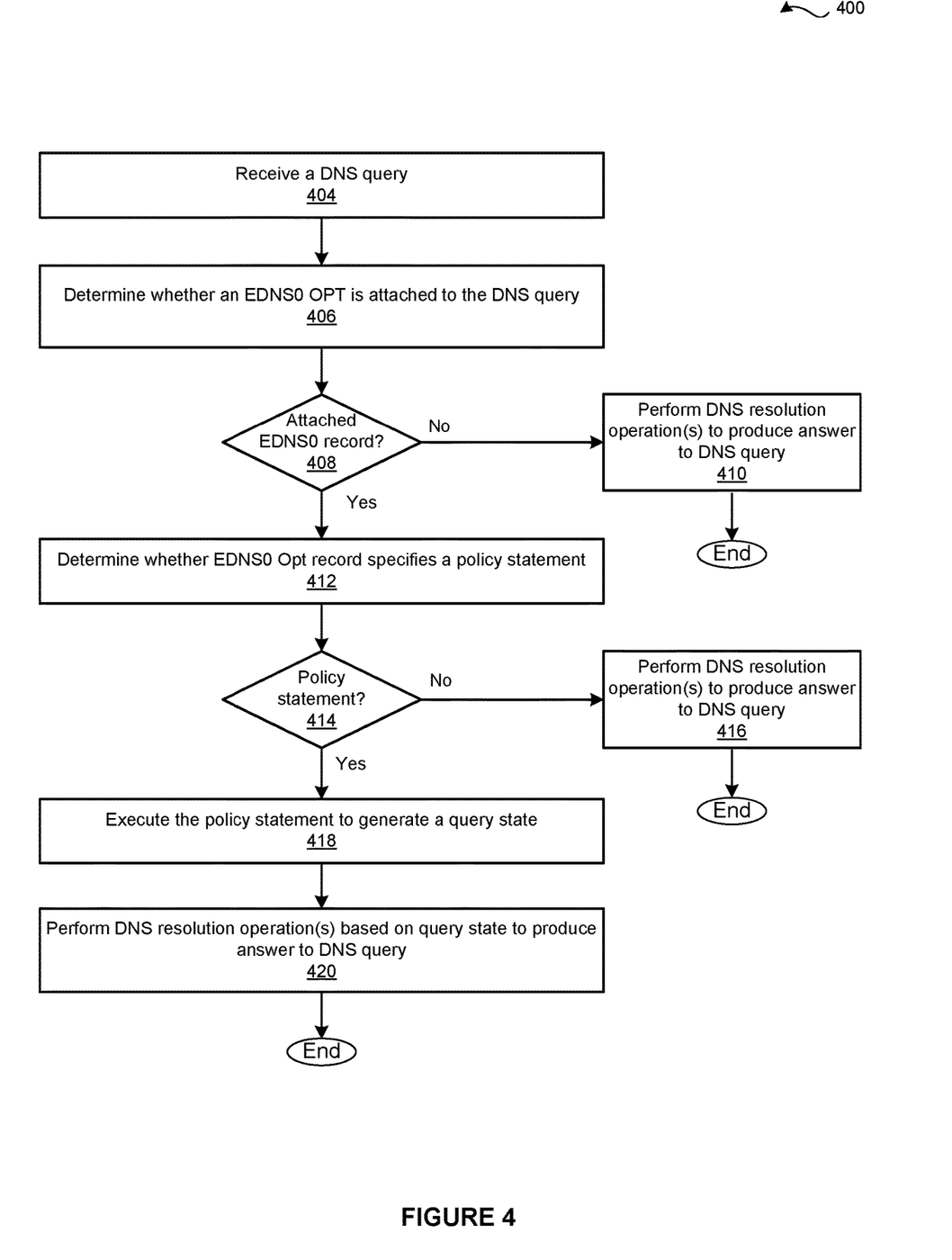
FIG. 4 is a flow diagram of method steps for processing a domain name service (DNS) query, according to various embodiments of the present invention.

FIG. 4 is a flow diagram of method steps for processing a domain name service (DNS) query, according to various embodiments of the present invention. Although the method steps are described with reference to the systems of FIGS. 1-2, persons skilled in the art will understand that any system configured to implement the method steps, in any order, falls within the scope of the present invention. In various embodiments, the method steps of FIG. 4 may be implemented by any "responder" that is capable of receiving and processing the DNS request 140 based on the policy statement 254 associated with the DNS request 140. For example, in some embodiments, the recursive resolver 150 that includes the policy interpreter 170 may implement the method steps of FIG. 4. In other embodiments, the authoritative name server 180 that includes the policy interpreter 170 may implement the method steps of FIG. 4.

As shown, a method 400 begins at step 404, where a responder receives a DNS query 140 that requests information based on a domain name. At step 406, the responder determines whether any EDNS0 OPT record 250 is attached to the DNS query 140. If, at step 408, the responder determines that the EDNS0 OPT record 250 is not attached to the DNS query 140, then the method 400 proceeds to step 410. At step 410, the responder performs one or more DNS resolution operations to produce an answer to the DNS query 140, and the method 400 terminates. As persons skilled in the art will recognize, as part of performing the DNS resolution operations, the responder may generate any number of additional DNS queries 140 in any technically feasible fashion.

If, however, at step 408, the responder determines that the EDNS0 OPT record 250 is attached to the DNS query 140, then the method 400 proceeds directly to step 412. At step 412, the responder determines whether the EDNS0 OPT record 250 specifies the policy statement 254. The responder may determine whether the EDNS0 OPT record 250 specifies the policy statement 254 in any technically feasible fashion. For example, in some embodiments, the responder may perform one or more comparison operations on the EDNS0 OPT record 250 to determine whether the EDNS0 OPT record 250 includes the policy code 252 that signifies policy-based DNS resolution.

If, at step 414, the responder determines that the EDNS0 OPT record 250 does not include the policy code 252 that signifies policy-based DNS resolution, then the method 400 proceeds to step 416. At step 416, the responder performs one or more DNS resolution operations to produce an answer to the DNS query 140, and the method 400 terminates. As persons skilled in the art will recognize, as part of performing the DNS resolution operations, the responder may generate any number of additional DNS queries 140 in any technically feasible fashion. In various embodiments, the behavior of the responder may or may not be impacted based on the EDNS0 OPT record 250. For example, in some embodiments, if the EDNS0 OPT record 250 specifies an EDNS-client-subnet, then the responder may implement a predetermined behavior based on the IP address specified in the EDNS-client-subnet.

If, however, at step 414, the responder determines that the EDNS0 OPT record 250 includes the policy code 252 that signifies policy-based DNS resolution, then the method 400 proceeds directly to step 418. At step 418, the policy interpreter 170 included in the responder executes the policy statement 254 to generate the query state 260. The policy interpreter 170 may execute the policy statement 254 in any technically feasible fashion. For example, if the policy statement 254 is written in the Lua scripting language, then the policy generator 170 executes the policy statement using a Lua interpreter. As a general matter, the policy statement may specify any type of behavior in any technically feasible fashion. For example, the policy statement may include any combination of preferences and requirements that may affect the DNS resolution process.

At step 420, the responder performs one or more DNS resolution operations based on the query state 260 to produce an answer to the DNS query 140, and the method 400 terminates. Notably, if the responder is unable translate the domain name specified in the DNS query 140 into an IP addresses based on required behavior specified in the policy statement 254, then the responder produces a negative DNS response 195. Further, as persons skilled in the art will recognize, as part of performing the DNS resolution operations, the responder may generate any number of additional DNS queries 140 in any technically feasible fashion. The query state 260 may affect the number, resolution, and/or content of the additional DNS queries 140 that the recursive resolver 150 generates as part of resolving the DNS query 140. In various embodiments, the responder includes the policy generator 130. In such embodiments, the responder may or may not generate additional policy statements 254 based on the query state 260.

In sum, the disclosed techniques enable clients to guide the DNS resolution process. In operation, a client implements a policy generator and recursive resolver implements a policy interpreter. As part of generating a DNS query, the policy generator produces an Extension Mechanisms for DNS Version 0 (EDNS0) OPT record that specifies a policy statement. The policy statement specifies DNS resolution behavior via one or more commands. The client then attaches the EDNS0 OPT record in the DNS query and transmits the DNS query to the recursive resolver. When the recursive resolver receives the DNS query, the policy interpreter executes the commands specified in the policy statement to generate a query state that reflects the specified DNS resolution behavior. The recursive resolver then processes the DNS query based on the query state.

As part of processing the DNS query, the recursive resolver may generate and transmit new DNS queries to authoritative servers. Some recursive resolvers include a policy generator in addition to the policy interpreter. If the recursive resolver includes a policy generator, then for each new DNS query, the policy generator generates a new EDNS0 OPT record that includes a new policy statement that the recursive resolver attaches to the new DNS query. Together, the policy generator and the policy interpreter included in the recursive resolver ensure that any new DNS queries, the resolution of the new DNS queries, and any new policy statements comply with the policy statement in the DNS query received from the client.

Advantageously, the techniques described herein enable clients to control the DNS resolution process. Because the client specifies a policy statement that defines how DNS servers respond to a DNS query based on commands, the client may directly and flexibly control a variety of behavior involved in the DNS resolution process. Notably, a client may specify resolution preferences, resolution restrictions that may result in a negative answer to the DNS query, security policies that maintain the privacy of the client, and so forth. By contrast, conventional DNS resolution guidance mechanisms that involve DNS servers interpreting client data to infer policies may not properly reflect the client preferences.

1. In some embodiments, a computer-readable storage medium includes instructions that, when executed by a processor, cause the processor to process a domain name service (DNS) query by performing the steps of determining that the DNS query is associated with a policy statement; executing one or more commands specified in the policy statement to generate a query state; and performing one or more DNS resolution operations based on the query state to generate a response to the DNS query.

2. The computer-readable storage medium of clause 1, wherein the policy statement is based on at least one of a scripting language and a markup language.

3. The computer-readable storage medium of clauses 1 or 2, wherein the policy statement is included in a pseudo resource record that is attached to the DNS query.

4. The computer-readable storage medium of any of clauses 1-3, wherein the pseudo resource record comprises an Extension Mechanisms for DNS pseudo resource record that specifies an option code associated with policy-based DNS resolution.

5. The computer-readable storage medium of any of clauses 1-4, wherein determining that the DNS query is associated with the policy statement comprises performing one or more comparison operations on the pseudo resource record and the option code.

6. The computer-readable storage medium of any of clauses 1-5, wherein the one or more commands specify at least one of resolution preferences, resolution restrictions, and security requirements.

7. The computer-readable storage medium of any of clauses 1-6, wherein performing one or more DNS resolution operations comprises comparing a first authoritative name server to a second authoritative name server based on the query state to determine a preferred authoritative name server; generating a new DNS query based on at least one of the DNS query and the query state; and transmitting the new DNS query to the preferred authoritative name server.

8. The computer-readable storage medium of any of clauses 1-7, wherein performing one or more DNS resolution operations further comprises, prior to transmitting the new DNS query to the preferred authoritative name sever, generating a new policy statement based on the query state, and associating the new policy statement record with the new DNS query.

9. In some embodiments, a computer-readable storage medium includes instructions that, when executed by a processor, cause the processor to control a domain name service (DNS) resolution process by performing the steps of generating a policy statement that includes one or more commands that, when executed by a DNS server, control one or more DNS resolution operations; associating the policy statement with a DNS query; and transmitting the DNS query and the associated policy statement to the DNS server to retrieve information associated with a domain name specified in the DNS query.

10. The computer-readable storage medium of clause 9, wherein the policy statement is based on at least one of a scripting language and a markup language.

11. The computer-readable storage medium of clauses 9 or 10, wherein associating the policy statement with the DNS query comprises generating a pseudo resource record that includes the policy statement; and attaching the pseudo resource record to the DNS query.

12. The computer-readable storage medium of any of clauses 9-11, wherein the pseudo resource record comprises an Extension Mechanisms for DNS pseudo resource record.

13. The computer-readable storage medium of any of clauses 9-12, further comprising configuring the pseudo resource record to specify an option code associated with policy-based DNS resolution.

14. The computer-readable storage medium of any of clauses 9-13, wherein the one or more commands specify at least one of resolution preferences, resolution restrictions, and security requirements.

15. The computer-readable storage medium of any of clauses 9-14, wherein the DNS server comprises an authoritative name server or a recursive router.

16. In some embodiments, a method for processing a domain name service (DNS) query comprises determining that the DNS query is associated with a policy statement that includes one or more commands; executing the one or more commands to generate a query state; and generating a response to the DNS query based on the query state.

17. The method of clause 16, wherein the policy statement is based on at least one of a scripting language and a markup language.

18. The method of clause 16 or 17, wherein the policy statement is included in a pseudo resource record that is attached to the DNS query.

19. The method of any of clauses 16-18, wherein generating the response to the DNS query comprises determining that both a first Internet Protocol (IP) address and a second IP address satisfy the DNS query; comparing one or more characteristics associated with the first IP address to one or more characteristics associated with the second IP address based on the query state to determine a preferred IP address; and producing the response that specifies the preferred IP address.

20. The method of any of clauses 16-19, wherein generating the response to the DNS query comprises determining a set of servers that correspond to a domain name specified in the DNS query; determining that none of the servers included in the set of servers satisfies one or more restrictions associated with the query state; and producing the response that indicates that the DNS query is unsuccessful.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method comprising:
receiving, at a recursive resolver, a DNS query;
determining, at the recursive resolver, a record is attached to the DNS query;
executing, at the recursive resolver, one or more comparison operations on policy code;
determining, at the recursive resolver, whether the record includes a policy statement;
upon determining that the record includes the policy statement, executing, at the recursive resolver, the policy statement;
upon executing the policy statement, generating, at the recursive resolver, a query state, wherein the query state includes information controlling DNS resolution operations executed by the recursive resolver; and
executing, at the recursive resolver and based on the query state, the DNS resolution operations,
wherein the DNS query includes a policy code that indicates programmatic control of a resolution of the DNS query is enabled.

2. The computer-implemented method of claim 1, wherein the DNS query includes the policy statement.

3. The computer-implemented method of claim 1, further comprising: generating, at the recursive resolver, a DNS response based on the query state.

4. The computer-implemented method of claim 1, wherein the policy statement is included in a pseudo resource record of the DNS query.

5. The computer-implemented method of claim 4, wherein the pseudo resource record comprises an Extension Mechanisms for Domain Name System pseudo resource record.

6. The computer-implemented method of claim 1, wherein the recursive resolver includes a policy interpreter configured to be responsive to the policy code of the DNS query by performing:
identifying the policy statement; and
executing one or more commands of the policy statement to generate the query state.

7. The computer-implemented method of claim 6, wherein the one or more command comprise at least one of: a resolution preference, a resolution restriction, or a security requirement.

8. A computer system comprising:
a memory storing a resolution application; and
a processor that is coupled to the memory and executes the resolution application by performing the steps of:
receiving, at a recursive resolver, a DNS query;
determining, at the recursive resolver, a record is attached to the DNS query;
executing, at the recursive resolver, one or more comparison operations on policy code;
determining, at the recursive resolver, whether the record includes a policy statement;
upon determining that the record includes the policy statement, executing, at the recursive resolver, the policy statement;
upon executing the policy statement, generating, at the recursive resolver, a query state, wherein the query state includes information controlling DNS resolution operations executed by the recursive resolver; and
executing, at the recursive resolver and based on the query state, the DNS resolution operations,
wherein the DNS query includes a policy code that indicates programmatic control of a resolution of the DNS query is enabled.

9. The computer system of claim 8, wherein the DNS query includes the policy statement.

10. The computer system of claim 8, further performing the step of: generating, at the recursive resolver, a DNS response based on the query state.

11. The computer system of claim 8, wherein the policy statement is included in a pseudo resource record of the DNS query.

12. The computer system of claim 11, wherein the pseudo resource record comprises an Extension Mechanisms for Domain Name System pseudo resource record.

13. The computer system of claim 8, wherein the recursive resolver includes a policy interpreter configured to be responsive to the policy code of the DNS query by performing:
identifying the policy statement; and
executing one or more commands of the policy statement to generate the query state.

14. The computer system of claim 13, wherein the one or more command comprise at least one of: a resolution preference, a resolution restriction, or a security requirement.

15. One or more non-transitory computer-readable storage media including instructions that, when executed by one or more processors, cause the one or more processors to perform the steps of:

receiving, at a recursive resolver, a DNS query;

determining, at the recursive resolver, a record is attached to the DNS query;

executing, at the recursive resolver, one or more comparison operations on policy code;

determining, at the recursive resolver, whether the record includes a policy statement;

upon determining that the record includes the policy statement, executing, at the recursive resolver, the policy statement;

upon executing the policy statement, generating, at the recursive resolver, a query state, wherein the query state includes information controlling DNS resolution operations executed by the recursive resolver; and executing, at the recursive resolver and based on the query state, the DNS resolution operations, wherein the DNS query includes a policy code that indicates programmatic control of a resolution of the DNS query is enabled.

16. The one or more non-transitory computer-readable media of claim 15, wherein the DNS query includes the policy statement.

17. The one or more non-transitory computer-readable media of claim 15, further including instruction that, when executed by the one or more processors, cause the one or more processors to perform the steps of: generating, at the recursive resolver, a DNS response based on the query state.

18. The one or more non-transitory computer-readable media of claim 15, wherein the policy statement is included in a pseudo resource record of the DNS query.

19. The one or more non-transitory computer-readable media of claim 18, wherein the pseudo resource record comprises an Extension Mechanisms for Domain Name System pseudo resource record.

20. The one or more non-transitory computer-readable media of claim 15, wherein the recursive resolver includes a policy interpreter configured to be responsive to the policy code of the DNS query by performing:

identifying the policy statement; and executing one or more commands of the policy statement to generate the query state.

* * * * *